(12) United States Patent
Andreoli et al.

(10) Patent No.: US 6,227,405 B1
(45) Date of Patent: May 8, 2001

(54) GREASE TANK AND GREASE INLET FOR STORING AND SECURING USED COOKING GREASE

(75) Inventors: James A. Andreoli, La Habra; Domingo Resendez, Norwalk, both of CA (US)

(73) Assignee: Baker Commodities, Inc., Los Angeles, CA (US)

( * ) Notice: Subject to any disclaimer, the term of this patent is extended or adjusted under 35 U.S.C. 154(b) by 0 days.

(21) Appl. No.: 09/314,868

(22) Filed: May 19, 1999

(51) Int. Cl.$^7$ .................................................. B65D 51/04
(52) U.S. Cl. ........................... 220/840; 99/408; 220/210; 220/372; 220/810; 220/836
(58) Field of Search ............................... 210/348; 99/408; 220/810, 826, 840, 836, 256, 370, 372, 254, 730, 210, 373, 484, 560.03, DIG. 6, 748

(56) References Cited

U.S. PATENT DOCUMENTS

| | | | |
|---|---|---|---|
| 871,955 | * 11/1907 | Reed | 220/484 |
| 1,104,773 | * 7/1914 | Bradshaw | 220/731 X |
| 1,261,495 | * 4/1918 | Doolin . | |
| 1,275,441 | * 8/1918 | Johnston | 220/373 |
| 1,664,853 | * 4/1928 | Firth | 220/484 X |
| 2,102,924 | * 12/1937 | Thomas | 220/484 X |
| 2,501,762 | * 3/1950 | Davis, Jr. | 220/484 |
| 2,626,387 | * 1/1953 | Berry | 220/484 X |
| 2,801,762 | * 8/1957 | Atherton | 220/731 X |
| 2,883,853 | * 4/1959 | Forni | 220/484 X |
| 3,403,644 | * 10/1968 | Heitz | 220/370 X |
| 4,444,095 | * 4/1984 | Anetsbetger et al. | 99/408 |
| 4,450,828 | 5/1984 | Onken et al. . | |
| 4,539,828 | * 9/1985 | Teleky . | |
| 4,541,446 | * 9/1985 | Hogan . | |
| 4,555,339 | * 11/1985 | Graves et al. | 220/256 X |
| 4,775,066 | * 10/1988 | Keppeler | 220/484 |
| 5,183,280 | * 2/1993 | Gresch | 220/DIG. 6 X |
| 5,372,274 | * 12/1994 | Freedland | 220/DIG. 6 X |
| 5,823,097 | * 10/1998 | Dirck | 99/408 |
| 5,908,551 | * 6/1999 | Onken | 99/408 X |
| 5,988,414 | * 11/1999 | Schwarz et al. | 220/373 X |

FOREIGN PATENT DOCUMENTS

593 * 1/1965 (AT) ..................................... 220/256

OTHER PUBLICATIONS

Advertisement from Render Magazine, Aug. 1993, p. 28, vol. XXII, No. 4, published by Editors West, 10961 Desert Lawn Drive #57, Calimesa, CA 92320.
Advertisement from Render Magazine, Jun. 1996, p. 26, vol. XXIV, No. 3, published by Editors West, 10961 Desert Lawn Drive #57, Calimesa, CA 92320.
Advertisement from Render Magazine, Dec. 1998, p. 19, vol. XXVII, No. 6, published by Editors West, 10961 Desert Lawn Drive #57, Calimesa, CA 92320.
Advertisement from Render Magazine, Dec. 1998, p. 27, vol. XXVII, No. 6, published by Editors West, 10961 Desert Lawn Drive #57, Calimesa, CA 92320.
Advertisement "Grease Collection Made Easy With Onken's Bulk System" by Onken's, Inc.
Advertisement "Modernize Your Grease Storage Area . . . " by Baker Commodities, Inc. and its Affiliates.

* cited by examiner

Primary Examiner—Allan N. Shoap
Assistant Examiner—Robin A Hylton
(74) Attorney, Agent, or Firm—Christie, Parker & Hale, LLP

(57) ABSTRACT

An apparatus for the secure storage of used cooking grease comprises a tank, having one or more walls and a top and bottom, and a grease inlet located at the top of the tank and having upper and lower openings, with each opening at least partially spanned by one or more members.

19 Claims, 4 Drawing Sheets

GREASE TANK AND GREASE INLET FOR STORING AND SECURING USED COOKING GREASE

FIELD OF THE INVENTION

This invention relates generally to improvements in the collection and storage of cooking grease and, more particularly, to an improved storage tank designed for convenient and secure outside storage of used cooking grease.

BACKGROUND OF THE INVENTION

Collection of used cooking grease is a competitive field. Restaurants that use cooking grease typically contract with a vendor, who provides a grease storage tank at the restaurant and collects used grease from the storage tank at scheduled intervals. The used grease is then processed at a central facility and converted into soap, plasticizers, and other products.

Restaurants use a large quantity of grease every day. At some point, the grease becomes undesirable for further use, and must be disposed of. The grease, in a liquid form and generally still heated above the ambient temperature, is poured into a storage vessel for later retrieval by a collector. Previously, used grease was stored in barrels, which resulted in large amounts of spillage and necessitated frequent collection of the grease or use of multiple barrels for storage. An improvement was made whereby large, centrally located storage tanks replaced the smaller, individual barrels. Cooking grease from various locations in the restaurant is transported to a central grease storage tank, which is typically located outside the restaurant, usually in an alley or location with vehicular access for the collector.

Grease storage tanks are generally large containers, often shaped like a dumpster, or possibly a horizontally oriented cylindrical tank, with a centrally located lid that opens up to receive the grease. Under the lid is a grease inlet port. Generally, the grease inlet port is located high off the ground, creating a dangerous condition in which restaurant personnel must lift the hot liquid grease high into the air in order to pour the grease into the tank, thereby exposing themselves to risk of injury and increasing the chances of spillage. In addition, access to the lid, and thus the tank, is generally available only from one side of the tank.

Grease storage tanks are generally constructed of steel and are susceptible to rust from standing water and moisture accumulation due to poor water runoff. Corrosion from moisture buildup on the top outside and bottom outer surface of grease tanks significantly shortens the working life of the tanks.

Lids or covers for grease tanks are also generally constructed of steel, making them heavy and burdensome for restaurant personnel to open and, once open, difficult to close.

Used cooking grease is a valuable commodity, and a large tank of grease is an attractive target for thieves. Tanks that provide large lids and relatively easy access for restaurant personnel also provide easy access for thieves looking to steal large quantities of grease in a single stop. To prevent theft, some tanks are designed with smaller grease inlet ports, which make it more difficult for restaurant personnel to pour the hot cooking grease into the storage tank without spilling the grease and/or burning themselves. Smaller grease inlet ports not only make a difficult target for pouring the hot liquid, but also require that the used cooking grease be poured sufficiently slowly to avoid overflowing the grease receiving area, again increasing the chance of injury or spillage.

One anti-theft measure that has been used is the provision of a padlock for the lid or cover. However, the lock is generally exposed and subject to destruction from the outside. In addition, the lock can be circumvented by a grease thief armed with a bolt cutter.

Thus, there exists a need for a grease tank providing ease of use, safety, security, durability, and weatherability.

SUMMARY OF THE INVENTION

The present invention provides an improved tank for the secure storage of used cooking grease. In one embodiment, the tank comprises one or more walls, a top and a bottom, and a grease inlet located at or near the top of the tank. The grease inlet has upper and lower openings, each of which is at least partially spanned by one or more bars or a grate. The grease inlet can be locked in its closed position, preferably by a recessed locking bolt secured to the front side wall or top edge of the tank. In addition, the grease inlet can be pivoted up and out of the tank to allow an authorized agent to remove used cooking grease from the tank. Advantageously, the tank has a low profile and can be accessed from at least three sides by restaurant personnel and authorized disposal agents. The low profile makes it easy to pour used cooking grease into the tank without substantial risk of spillage or injury. In a preferred embodiment, both the bottom and the top of the tank are sloped to provide a path for condensation and other moisture build-up to run off the tank, preventing rust and extending the usable life of the tank.

BRIEF DESCRIPTION OF THE DRAWINGS

These and other features and advantages of the present invention will be better understood by reference to the following detailed description when considered in conjunction with the accompanying drawings, wherein.

DETAILED DESCRIPTION

Figure 1:
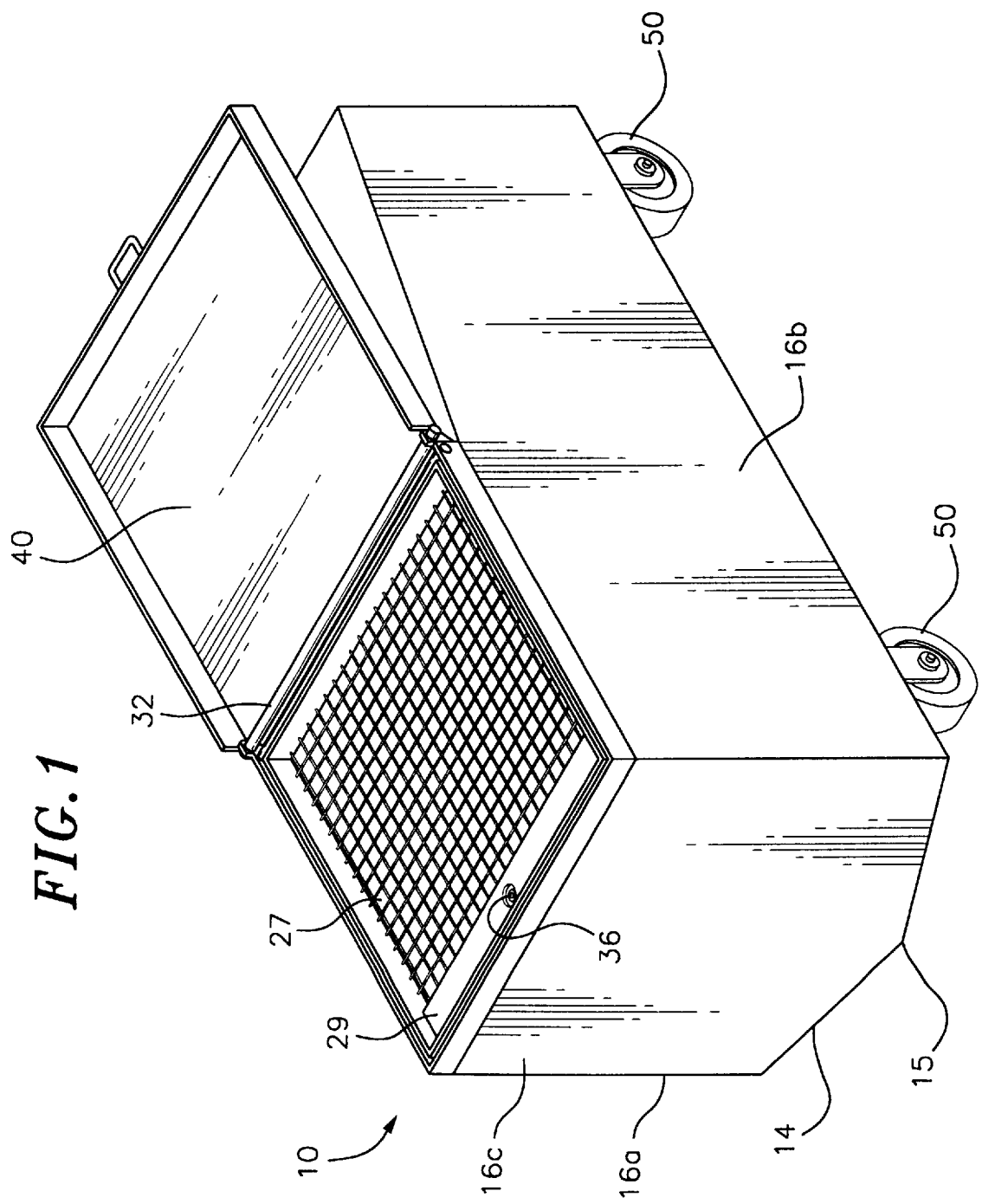
FIG. 1 is a perspective view of a grease tank in accordance with one embodiment of the present invention, with the grease inlet shown in its lowered position.
Figure 2:
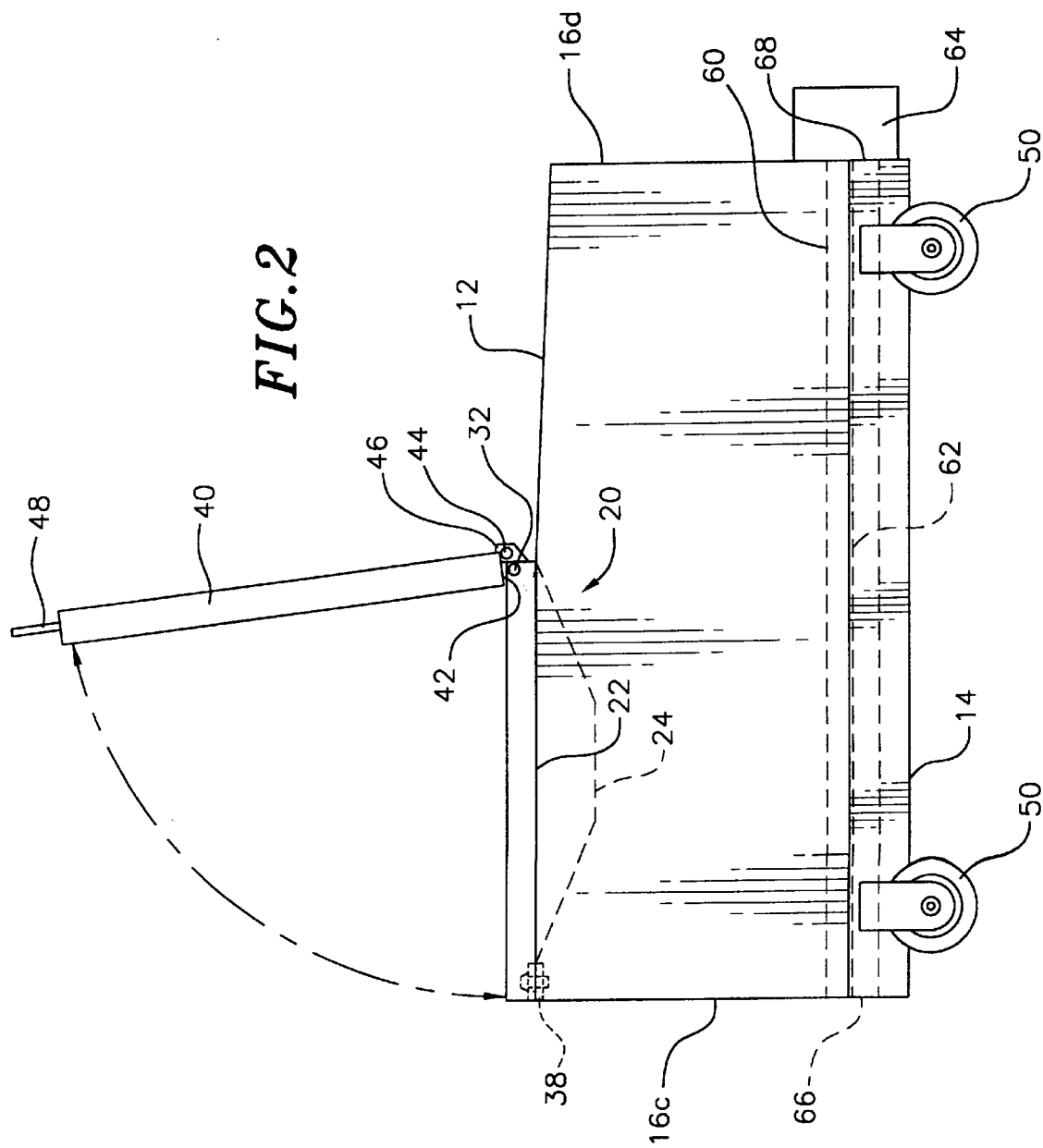
FIG. 2 is a side elevation view of the grease tank of FIG. 1.
Figure 3:
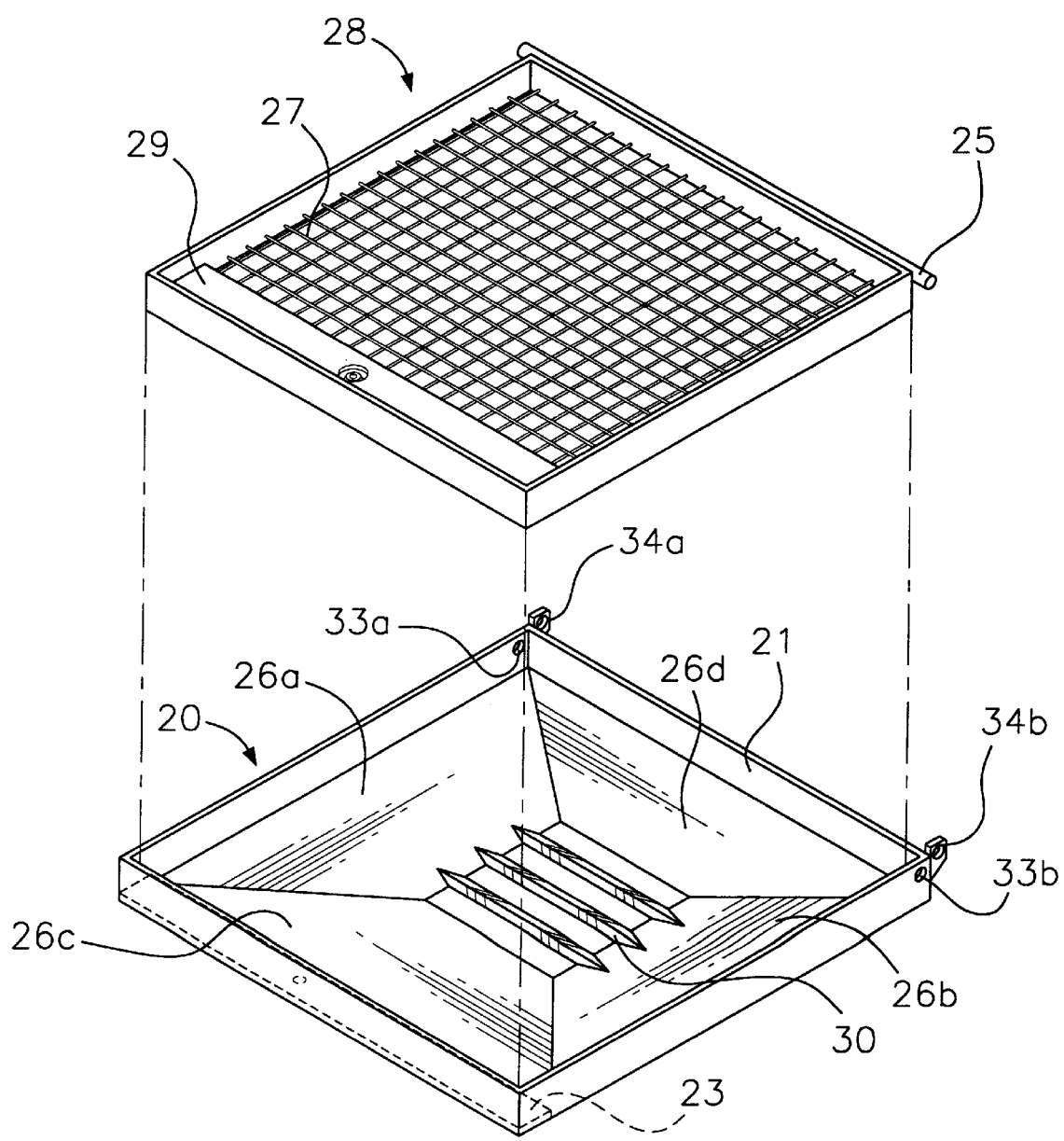
FIG. 3 is an exploded perspective view of the lid, grate, and grease inlet of the grease tank of FIG. 1.
Figure 4A:
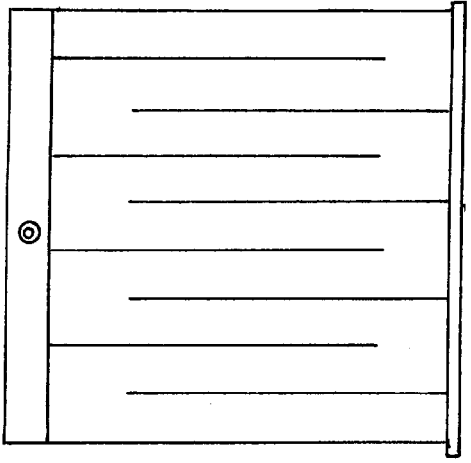
FIGS. 4A–D is a plan view of several embodiments of the grate in accordance with the present invention.
Figure 4B:
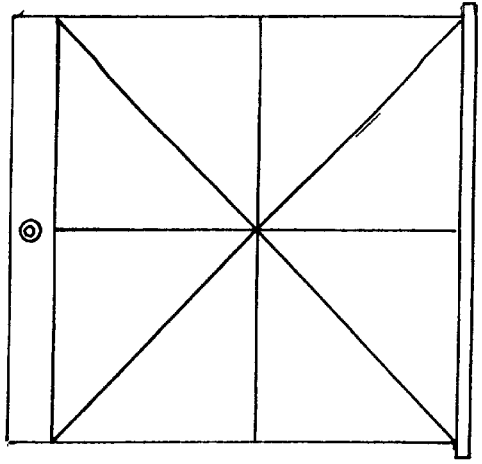
Figure 4C:
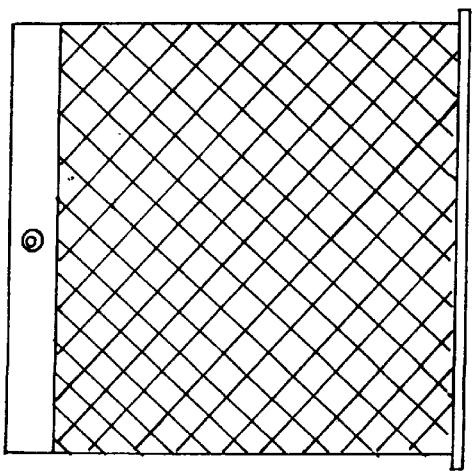
Figure 4D:
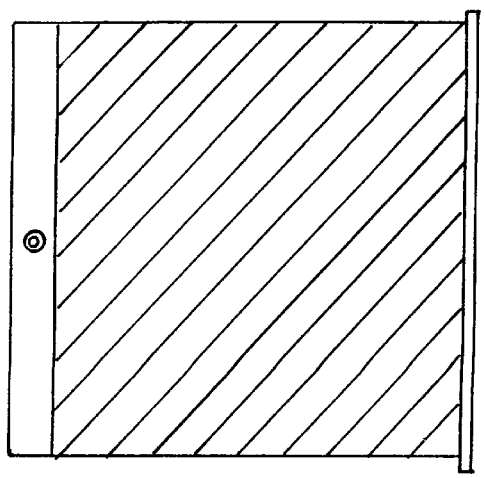

Reference is first made to FIGS. 1–3, wherein a preferred embodiment of a grease storage tank is shown. The tank 10 has a top 12 and a bottom 14, and four side walls 16a–16d arranged in a generally rectangular configuration. A grease inlet 20 located at or near the top of the tank provides access to the tank interior. A lid 40 covers the grease inlet when the tank is not being filled or emptied. Four wheels in casters 50 are bolted, welded, or otherwise secured to the bottom or lower sides of the tank. If desired, one or more handles (not shown) are secured to the tank to allow easy movement thereof.

The tank is constructed of any suitably strong, durable material capable of standing up to the elements and hot cooking grease. The tank is formed by any conventional means, including welding, casting, etc. A particularly preferred embodiment is constructed of 12 gauge mild steel, continuously welded. In a preferred embodiment the tank has a storage capacity of about 180 gallons, but other size tanks also can be made in accordance with the present invention.

The grease inlet 20 is located proximate the top of the tank; that is, at, in, or near the top of the tank, and has an upper opening 22 and a lower opening 24, separated by four sidewalls 26a–26d, which converge in generally trapezoidal cross section from the upper opening to the lower opening. The grease inlet 20 also has a substantially flat ledge 23 adjacent the upper opening 22. The ledge is located in substantially the same plane as the upper opening. In the embodiments shown in FIGS. 1–3, both the upper and lower openings of the grease inlet are rectangular (square), but either or both opening can have a circular or other shape. Preferably, the cross-sectional area of the lower opening is much less than that of the upper opening, making it more difficult for a grease thief to access the tank interior.

A grill or grate 28 covers the upper opening 22 of the grease inlet. The grate 28 has a substantially open, but barred, region 27, through which grease can be poured, and a solid front end 29 which extends toward the front wall 16c of the tank. When the grate is in its closed position, the lower face of the front end 29 of the grate 28 abuts the upper face of the flat ledge 23 of the grease inlet. The grate is movably coupled to the tank by a rod 25 located at the back end of the grate. In a preferred embodiment, a ½" diameter steel rod is used. In another embodiment, the grate is movably coupled to the grease inlet, with the rod 25 received by apertures 33a,b in the upper side walls of the grease inlet. In one embodiment, the barred region of the grate is constructed of ½" diameter steel rods, welded or otherwise secured together. Other materials, dimensions and configurations can be used, if sufficiently durable and proportioned to preclude or diminish the possibility of being dismantled by a bolt cutter or similar device.

The lower opening 24 of the grease inlet is also covered by a grill or grate or, more preferably, a plurality of bars or rods 30 preferably welded or otherwise secured in place. A preferred embodiment employs 1" angle iron, but other materials and dimensions can be used. The bars are spaced sufficiently close together to keep large debris from entering the tank, and also prevent unauthorized insertion of a hose into the tank in the event the upper grate is breached.

The grease inlet extends down into the tank when in its closed configuration, yet can be pivoted up and out of the tank when an authorized grease collector wishes to remove grease from the tank. In particular, an upper edge 21 of the grease inlet is movably coupled to the top of the tank by a rod 32 connected to the tank 10. The rod 32 is received by a pair of hinge flanges 34a, 34b coupled to the sides of the grease inlet. In a preferred embodiment, the grease inlet 20 has upper side walls which bound the upper opening 22 and ledge 23. Openings in two opposite side walls are configured as hinge flanges 34a, 34b to receive the rod 32, enabling movement of the grease inlet.

When the grease inlet is in its closed position, the flat ledge 23 at the front of the grease inlet is substantially horizontal, and the lower surface of the ledge 23 rests on a receiver 38 (i.e., a flange or ledge) attached to, or integral with, the interior of the front side wall 16c of the tank 10. Preferably, this receiver is a portion of 1" angle iron. The receiver 38 supports the grease inlet 20, and also limits its downward movement.

The grease inlet can be locked in place, preferably by a recessed bolt lock 36 located in the front end 29 of the grate 28. The front end 29 of the grate 28 is configured to be substantially parallel to the ledge 23 of the grease inlet when locked. The recessed bolt lock 36 extends through the ledge 23 to the receiver 38, which extends generally from the front sidewall 16c of the tank. Thus both the grate 28 and the grease inlet 20 are in their closed positions, locked to the receiver 38. In other embodiments, the recessed bolt lock may also couple with a receiver attached to the top of the tank or directly to a wall of the tank. A mated security wrench key (not shown), similar to those used with locking lug nuts for automobile wheels, provides a preferred mechanism for securing the grease inlet in place. However, other locking mechanisms that can be protectively recessed in the grease inlet also can be used.

The entire grease inlet is covered by a lid 40 coupled to the top of the tank. For ease of use, the lid is made of a strong, but lightweight, durable plastic. Alternatively, a rigid, durable, lightweight rubber, metal, or composite material is used. In the embodiment shown in FIGS. 1 and 2, a rear edge 42 of the lid is secured to a rod attached to the top of the tank. The lid is configured to movably couple with the rod by a pair of hinge flanges 46a, 46b. In an alternate embodiment, a rear edge of the lid is attached to the same rod 32 about which the grease inlet can pivot. A handle 48 at the opposite edge of the lid enables the lid to be lifted away from the grease inlet when grease is to be added or drained from the tank.

To reduce rust caused by water, and exposure to the elements, the bottom 14 of the tank is sloped from the outside edges of the left and right walls 16a, 16b toward the center line 15 of the bottom surface, allowing liquid runoff and preventing moisture build-up. This is shown in FIG. 1. Alternatively, the bottom can slope entirely from one sidewall to another, laterally or longitudinally. The top 12 of the tank is also sloped, from one sidewall to another or, as shown in FIGS. 1 and 2, from a portion of the tank generally adjacent the lid hinge mechanism toward the rear end of the tank. Other sloped configurations can also be used.

When the grease storage tank is to be used in colder climates where the ambient temperature may cause solidification of the grease inside the tank, a heating mechanism is provided. A preferred embodiment is shown in FIG. 2. A hollow heating tube 60 is located inside the tank, at or near the tank bottom, extending the length of the tank. Preferably, the heating tube is constructed of three inch square steel tubing, but it will be appreciated that any thermally conductive material capable of withstanding high heat and extended submersion in grease, and of such a size to accommodate a resistive heating element, can be used. A resistive heating element 62 is located inside the tube and is electrically coupled to a heating element controller 64, which is electrically coupled to an electric power source (not shown). In a preferred configuration, a first end 66 of the heating tube is welded to or otherwise sealingly secured to the interior of the front tank wall 16c, while a second end 68 of the heating tube is attached to the interior of the rear tank wall 16d to prevent escape of grease. The second end 68 of the heating tube is functionally connected to the heating element controller 64, which is attached the exterior of rear tank wall 16d. A plurality of perforations (not shown) along the length of the heating tube allow liquid grease to enter the tube from the top as the tank is filled. Preferably, the perforations are spaced along the upper surface of the tube 60, aligned on the centerline. Consequently, the heating element will be completely enveloped by liquid grease, even when the level of grease in the tank is below the heating tube level. This is important, as many resistive heating elements are designed to operate only when immersed in a liquid, and would otherwise fail if operated in open air, due to the greatly reduced heat transfer of air as compared to liquid grease. In another embodiment, the perforations could also be located along the sides of the tube, preferably above the midpoint, but at least high enough that the level of grease remaining in the tube is above the heating element.

It will be appreciated that, as an alternative to the use of a heating element, an external heat source, such as a torch, can be applied directly to the bottom or sides of the tank to heat the grease.

The grease storage tank is conveniently used by both restaurant operators and authorized grease disposal agents. To deposit used grease in the tank, a person opens the lid and pours the liquid grease onto the upper grate 28, directly into the upper opening 22 of the grease inlet. The grease flows through the grease inlet, past the lower grate or bars 30, and out the lower opening of the grease inlet, into the tank. Because of the large cross-sectional areas of the upper opening of the grease inlet, and its location at one end of the tank, easy access to the tank from any of three sides 16*a*–16*c* is accommodated. In a preferred embodiment, the top of the tank is configured relatively low to the ground (e.g., about 2½' to 3'), making it easy to pour used cooking grease into the tank without having to lift a container of grease high into the air.

Removal of used grease from the tank by authorized disposal agents is also convenient. The lid to the tank is opened, and the recessed lock is unlocked. The grate and the grease inlet are pivoted up and out of the tank. A hose can then be inserted into the tank, and the contents of the tank drained. When the grate and the grease inlet are in their closed configuration and locked in place, however, unauthorized removal of the grease is extremely difficult. Theft would require not only destruction or vandalism of the grate, but also destruction or vandalism of the lower opening's bars or grate. Moreover, the cross-sectional area of the lower opening is preferably much less than that of the upper opening, thus limiting the size of hose that a would-be thief could insert down into the tank in the event he or she successfully breached the two grates or protective coverings.

The present invention has been described and illustrated with respect to a preferred embodiment, but, in its broader aspect, is not limited to the specific details shown and described herein. Departures may be made from such details without departing from the principles of the invention and without sacrificing its chief advantages.

For example, the overall shape of the tank need not be rectangular, but could easily be cylindrical or even spherical. In the former case, the tank has a single wall, a top and a bottom. In the latter case, the entire tank has but one wall. Similarly, the lid securing the tank opening need not be hingedly attached, but can be slidably attached, or even held in place by a friction fit or by releasable latches.

It will be appreciated that many different configurations, in addition to those disclosed above, exist for coupling the lid, the grate and the grease inlet to each other and to the tank, such as a variety of hinge configurations, or placing the hinges on the tank and attaching the pivot rods to the respective components, or possibly using a single rod attached to the top of the tank about which the lid, grate and grease inlet all pivot.

Additionally, the shape and construction of the grease inlet can be other than that described herein. For example, the shape of the grease inlet could be a cylinder or a truncated cone, in which case the has only a single wall. Alternatively, the four walls defining the grease need not slope at all but, could simply extend perpendicularly down into the tank. The lower opening need not be located directly opposite the upper opening but, instead, could simply extend along one edge of a lower region of the grease inlet. The protective grates and bars used to cover the upper and lower openings of the grease inlet can also have a variety of configurations, preferably designed so as to deter or prevent unauthorized insertion of a hose down into the tank. Non-limiting examples of such variations are shown in FIGS. 4A–D. Other variations are possible and are included within the scope of the invention, which is limited only by the following claims.

What is claimed is:

1. An apparatus for the secure storage of used cooking grease, the apparatus comprising:
   a tank, having one or more walls, a top, and a bottom;
   a grease inlet proximate the top of the tank, having upper and lower openings, wherein at least the top opening is partly or completely spanned by one or more bars, the upper and lower openings disposed spatially by one or more side walls; and
   wherein the grease inlet is movably coupled to the tank by hinge structure, such that direct access to the tank is gained.

2. An apparatus as recited in claim 1, further comprising a lid covering the grease inlet.

3. An apparatus as recited in claim 2, wherein the grease inlet is coupled to the tank and/or the lid by one or more hinges.

4. An apparatus as recited in claim 1, wherein the grease inlet has four walls.

5. An apparatus as recited in claim 1, wherein the grease inlet has four walls and a bottom.

6. An apparatus as recited in claim 5, wherein the lower opening is located in the bottom of the grease inlet.

7. An apparatus as recited in claim 1, wherein the upper opening of the grease inlet is larger than the lower opening of the grease inlet.

8. An apparatus as recited in claim 1, wherein the grease inlet is trapezoidal in cross section.

9. An apparatus as recited in claim 1, wherein the grease inlet is rectangular in cross section.

10. An apparatus as in claim 1, wherein the upper and lower openings are in substantially parallel planes.

11. An apparatus as recited in claim 1, further comprising one or more grease inlet locks.

12. An apparatus as recited in claim 11, wherein at least one lock is recessed in or near a wall of the tank.

13. An apparatus as recited in claim 13, wherein at least one lock is recessed in or near the upper opening of the grease inlet.

14. An apparatus for the secure storage of used cooking grease the apparatus comprising:
   a tank having one or more walls, a top, and a bottom;
   a grease inlet proximate the top of the tank and having a ledge and upper and lower openings, the upper and lower openings disposed spatially by one or more side walls, wherein the ledge is disposed adjacent the upper opening, and the lower opening is partially obstructed; and
   a grate having a solid front end and a substantially open but barred region, wherein the substantially open but barred region of the grate spans the upper opening of the grease inlet.

15. An apparatus as recited in claim 14, further comprising one or more grease inlet locks, such that at least one grease inlet lock is recessed in the solid front end of the grating.

16. An apparatus as recited in claim 15, wherein said at least one grease inlet lock is adapted to couple with a receiver in or near a wall of the tank.

17. An apparatus as recited in claim 15, wherein said at least one grease inlet lock is coupled to the ledge of the grease inlet and to a receiver extending from a wall of the tank.

18. An apparatus for the secure storage of used cooking grease, the apparatus comprising:
- a tank having four walls, a top, and a bottom;
- a grease inlet proximate the top of the tank and having rectangular upper and lower openings, each upper and lower openings being spanned by a plurality of bars, the upper and lower openings disposed spatially by four side walls there between;
- a lid; and
- a grease inlet lock;
- wherein the lid and the grease inlet are movably coupled to the tank such that movement of the lid and grease inlet allows direct access to the tank;
- wherein the grease inlet is movable coupled to the tank by hinge structure, such that direct access to the tank is gained; and
- wherein locking the grease inlet prevents access to the tank.

19. An apparatus as recited in claim 1, wherein at least the top opening is partly or completely spanned by a grate.

* * * * *

UNITED STATES PATENT AND TRADEMARK OFFICE
CERTIFICATE OF CORRECTION

PATENT NO. : 6,227,405 B1
DATED : May 8, 2001
INVENTOR(S) : James A. Andreoli and Domingo Resendez It is certified that error appears in the above-identified patent and that said Letters Patent is hereby corrected as shown below:

Column 6,
Line 45, replace "claim 13" with -- claim 11 --.

Column 8,
Line 5, replace "movable" with -- movably --.

Signed and Sealed this

First Day of April, 2003

JAMES E. ROGAN
*Director of the United States Patent and Trademark Office*